United States Patent
Kadosh

(10) Patent No.: US 11,381,512 B1
(45) Date of Patent: Jul. 5, 2022

(54) PRIORITY-BASED FLOW CONTROL MESSAGING FOR PORT EXTENDER

(71) Applicant: Cisco Technology, Inc., San Jose, CA (US)

(72) Inventor: Aviran Kadosh, Moreshet (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 36 days.

(21) Appl. No.: 16/865,838

(22) Filed: May 4, 2020

Related U.S. Application Data

(60) Provisional application No. 62/946,055, filed on Dec. 10, 2019.

(51) Int. Cl.
| | |
|---|---|
| H04L 47/2483 | (2022.01) |
| H04L 47/12 | (2022.01) |
| H04L 49/25 | (2022.01) |
| H04L 47/31 | (2022.01) |
| H04L 41/0803 | (2022.01) |

(52) U.S. Cl.
CPC ...... H04L 47/2483 (2013.01); H04L 41/0803 (2013.01); H04L 47/12 (2013.01); H04L 47/31 (2013.01); H04L 49/25 (2013.01)

(58) Field of Classification Search
CPC .. H04L 41/0803; H04L 47/12; H04L 47/2483
See application file for complete search history.

(56) References Cited

U.S. PATENT DOCUMENTS

| | | | |
|---|---|---|---|
| 10,027,590 B2 | 7/2018 | Sinha et al. | |
| 10,037,568 B2 * | 7/2018 | Taylor | ................... G06Q 40/06 |
| 10,193,706 B2 | 1/2019 | Bhattacharya et al. | |
| 10,516,620 B2 | 12/2019 | Mayer-Wolf et al. | |
| 2012/0275301 A1 * | 11/2012 | Xiong | ................... H04L 49/357 370/230 |
| 2012/0287787 A1 * | 11/2012 | Kamble | ................... H04L 49/70 370/235 |
| 2012/0287939 A1 * | 11/2012 | Leu | ........................ H04L 49/356 370/409 |
| 2014/0146708 A1 * | 5/2014 | Kamath | ................... H04L 49/70 370/254 |
| 2015/0244629 A1 * | 8/2015 | Sinha | ...................... H04L 47/18 370/236 |

(Continued)

OTHER PUBLICATIONS

Barrass et al., "Proposal for Priority Based Flow Control", new-dcb-pelissier-pfc-proposal-0308.pdf, Mar. 17, 2008, 3 pages.

(Continued)

*Primary Examiner* — Melanie Jagannathan

(74) *Attorney, Agent, or Firm* — Edell, Shapiro & Finnan, LLC

(57) ABSTRACT

A port extender provides individual flow control for ports multiplexed from a network device. The port extender is configured to multiplex a network device port across the front panel ports on the port extender. The port extender also determines that passing traffic through one of the front panel ports is degraded due to network congestion, and generates a flow control message identifying the front panel port. The port extender sends the flow control message via the network device port to the network device. The flow control message causes the network device coupled to the network device port to discontinue sending data for transmission from the degraded port.

20 Claims, 11 Drawing Sheets

(56) References Cited

U.S. PATENT DOCUMENTS

2017/0118041 A1*  4/2017  Bhattacharya ...... H04L 41/5054
2017/0339075 A1* 11/2017  Arad .................. H04L 49/9084
2018/0198720 A1   7/2018  Yerushalmi et al.
2022/0046465 A1*  2/2022  Zhang ............... H04W 28/0278

OTHER PUBLICATIONS

IEEE, "Addressing and Data Center Bridging (DCB)", https://1.ieee802.org/dcb/, downloaded Mar. 3, 2020, 3 pages.
Marvel, "Marvell Prestera® 98PX1012 Port Extender", downloaded Feb. 28, 2020, 2 pages.

* cited by examiner

PRIORITY-BASED FLOW CONTROL MESSAGING FOR PORT EXTENDER

CROSS REFERENCE TO RELATED APPLICATION

This application claims priority to U.S. Provisional Application No. 62/946,055, filed Dec. 10, 2019, the entirety of which incorporated by reference.

TECHNICAL FIELD

The present disclosure relates to flow control, particularly in high density network devices with port extenders.

BACKGROUND

There are systems (e.g., switches, routers) where the number of front panel ports, i.e., the number of physical ports of the system, is larger than the switch or the router silicon can support. Specifically, the system has fewer Media Access Control (MAC) blocks than is required by the number of front panel ports. To cope with this limitation of a switch/router, another device is used between the switch/router and the front panel ports, called a port extender. In the receive direction the port extender takes the traffic from multiple front panel ports and interleaves it over one link towards the switch/router. The port extender may multiplex signals from the source front panel port by marking each packet, e.g. by using a special tag or overriding the preamble that precedes the packet payload. The switch/router receives this one stream and demultiplexes it using this tag to stream per source front panel port.

In the transmit direction, the switch/router similarly multiplexes packets to different front panel ports over one link, and signals the destination front panel port using a special tag on the packet, e.g., by using a special tag or overriding the preamble that precedes the packet payload. The port extender de-multiplexes the stream by resolving the front panel port number in the tag and removes this tag from the packet. The packet is sent to the front panel port.

DESCRIPTION OF EXAMPLE EMBODIMENTS

Overview

A computer implemented method is provided to enable a port extender to provide individual flow control for ports multiplexed from a network device. The method includes configuring a port extender to multiplex a network device port across a plurality of ports on the port extender. The method also includes determining that passing traffic through a first port of the plurality of ports is degraded due to network congestion, and generating a flow control message identifying the first port. The method further includes sending the flow control message via the network device port to the network device. The flow control message causes the network device coupled to the network device port to discontinue sending data for transmission from the first port.

Example Embodiments

In a system that includes a port extender, a main buffer resides in the switch/router and therefore when congestion occurs in the network and flow control indication is received, the system may benefit from signaling the flow control to the switch/router and, more specifically, halting the traffic from the output queues that are targeted to the congested front panel port. Another source for congestion can also be the link between the port extender and the switch/router, where, in this case, all traffic sent through that link should be halted. Additionally, the congestion may be caused by switch/router sending data to the front panel port, i.e., via the port extender, at a higher rate than the front panel port can transmit.

Figure 1:
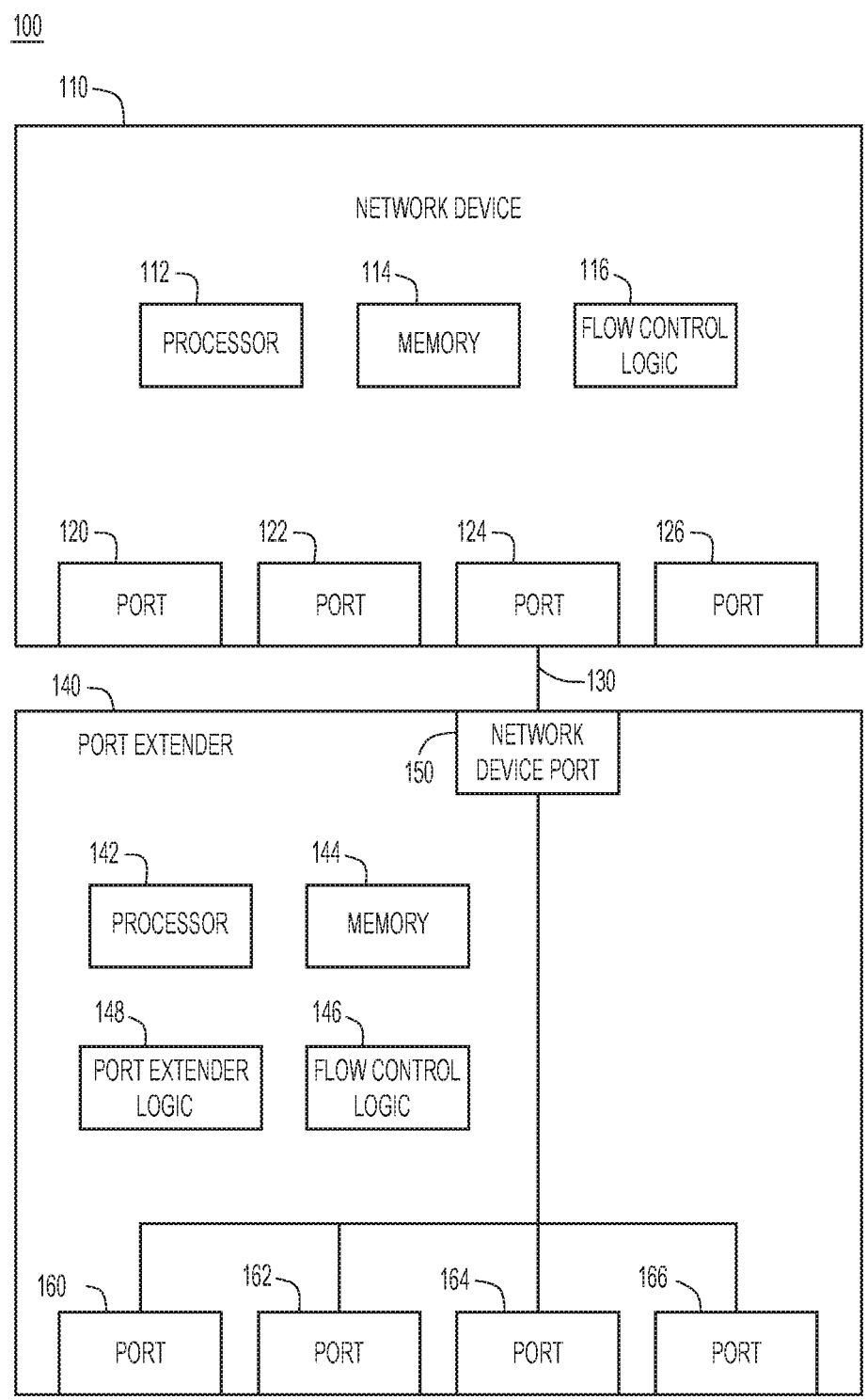
FIG. 1 is a simplified block diagram of a system of a network device and a port extender, according to an example embodiment.

Referring now to FIG. 1, a network system 100 is configured to expand the ports of a network device 110 into multiple ports, and to apply flow control to the network traffic through the expanded ports of the network device 110. The network device 110 includes a processor 112, a memory 114, and flow control logic 116. The processor 112 is configured to process instructions (e.g., stored in the memory 114) according to the techniques described herein. The flow control logic 116 may be stored at least in part in the memory 114, and is configured to adapt a priority-based flow control scheme according to the techniques described herein. The network device also includes ports 120, 122, 124, and 126.

The system 100 also includes a network link 130 connecting the network device 110 to a port extender 140. The port extender 140 is configured to multiplex a single port of the network device 110 that is connected to the network link 130 across multiple ports of the port extender 140, and to expand individual flow control for each of the ports. The port extender 140 includes a processor 142, and memory 144, flow control logic 146, and port extender logic 148. The processor 142 is configured to process instructions (e.g., stored in the memory 144) according to the techniques described herein. The flow control logic 146 may be stored at least in part in the memory 144, and is configured to adapt a priority-based flow control scheme according to the techniques described herein. The port extender logic 148 may be stored at least in part in the memory 144, and is configured to multiplex/demultiplex network traffic to/from the plurality of ports in the port extender to a single port in the network device 110.

The port extender 140 includes a network device port 150 that is connected to port 124 of the network device 110. The port extender multiplexes the network device port 150 across ports 160, 162, 164, and 166. In one example, the ports 160, 162, 164, and 166 of the port extender 140 may be called the front panel ports for the network device 110. For instance, the network device 110 and the port extender 140 may be deployed as a combined system 100 with the port extender 140 providing the front panel ports of the network device 110.

In another example, the network device may be a network switch or a network router. The network device 110 may have more or fewer ports than the four ports shown in FIG. 1, i.e., ports 120, 122, and 124. Similarly, the port extender 140 may multiplex the network device port 150 over more or fewer front panel ports than the four ports shown in FIG. 1, i.e., ports 160, 162, 164, and 166. Additionally, the network device 110 may be connected to multiple port extenders similar to port extender 140, to expand the number of physical ports available to each of the ports of the network device 110.

In a further example, the network device 110 and the port extender 140 may include one or more buffer and/or queues to assist in transmitting and receiving data frames. Some of the buffers and/or queues in the network device 110 and the port extender 140 are further described hereinafter with respect to FIG. 3A, FIG. 4A, FIG. 5A, and FIG. 6A.

To propagate flow control from the ports 160, 162, 164, and 166 of the port extender 140, the flow control logic 116 of the network device 110 and the flow control logic 146 of the port extender 140 coordinate to apply a new semantic to a Priority-based Flow Control (PFC) frame. The flow control logic 116 and 146 assign each of the ports 160, 162, 164, and 166 to a respective priority value in the priority vector of the PFC frame, and propagate flow control information by adapting the PFC frame between the network device 110 and the port extender 140.

Figure 2:
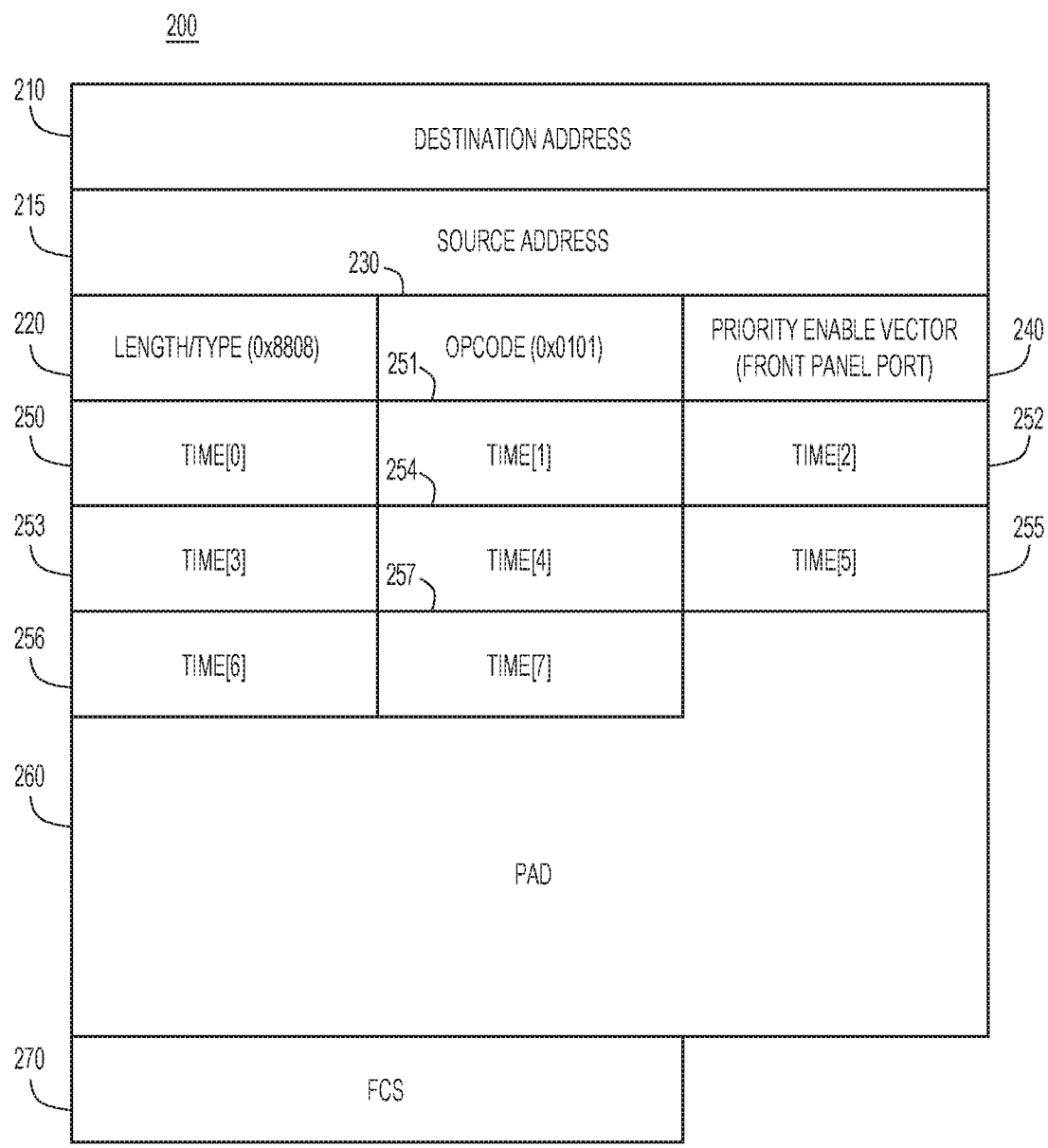
FIG. 2 illustrates a flow control message based on a Priority-based Flow Control (PFC) frame, according to an example embodiment.

Referring now to FIG. 2, an example of a PFC frame 200 that may be used to propagate flow control information is shown. The PFC frame 200 is formatted according to a standard format, but interpreted by the flow control logic (116, 146) in the network device 110 and port extender 140 to apply to the front panel ports of the port extender rather than the priority of network traffic. The PFC frame 200 includes six octets of a destination address 210 and six octets of a source address 215. For instance, the MAC address of the network device may be the destination address 210 and the MAC address of the port extender may be the source address 215. The PFC frame 200 next includes two octets encoding the length/type 220 of the frame (e.g., 08808 for an Ethernet flow control frame), followed by two octets encoding the operation code 230 (e.g., 0x0101 to indicate a PFC frame).

After the operation code 230, a standard PFC frame encodes two octets as the priority enable vector 240 to indicate which network traffic is to be paused or resumed. However, in the techniques described herein, the priority enable vector 240 is used to indicate to which front panel port of the port extender the PFC frame 200 applies. Following the priority enable vector 240, the PFC frame 220 encodes two octets for each of the time values 250-257 corresponding to the different priority values/front panel ports in the priority enable vector 240. After the time values 250-257, the PFC frame includes 26 octets of padding 260, and ends with four octets of a Frame Check Sequence (FCS) 270.

In other words, new semantics are applied to the priority enable vector 240 of the standard PFC format. The front panel ports of the port extender are represented by the priority bits in the priority enable vector 240. In one example, link level flow control is signaled by a reserved combination of the priority enable vector 240, i.e., a specific value of the priority enable vector 240 that is predetermined by the network device and the port extender. In another example, link level flow control may be signaled by changing the MAC Security Association (SA).

Figure 3A:
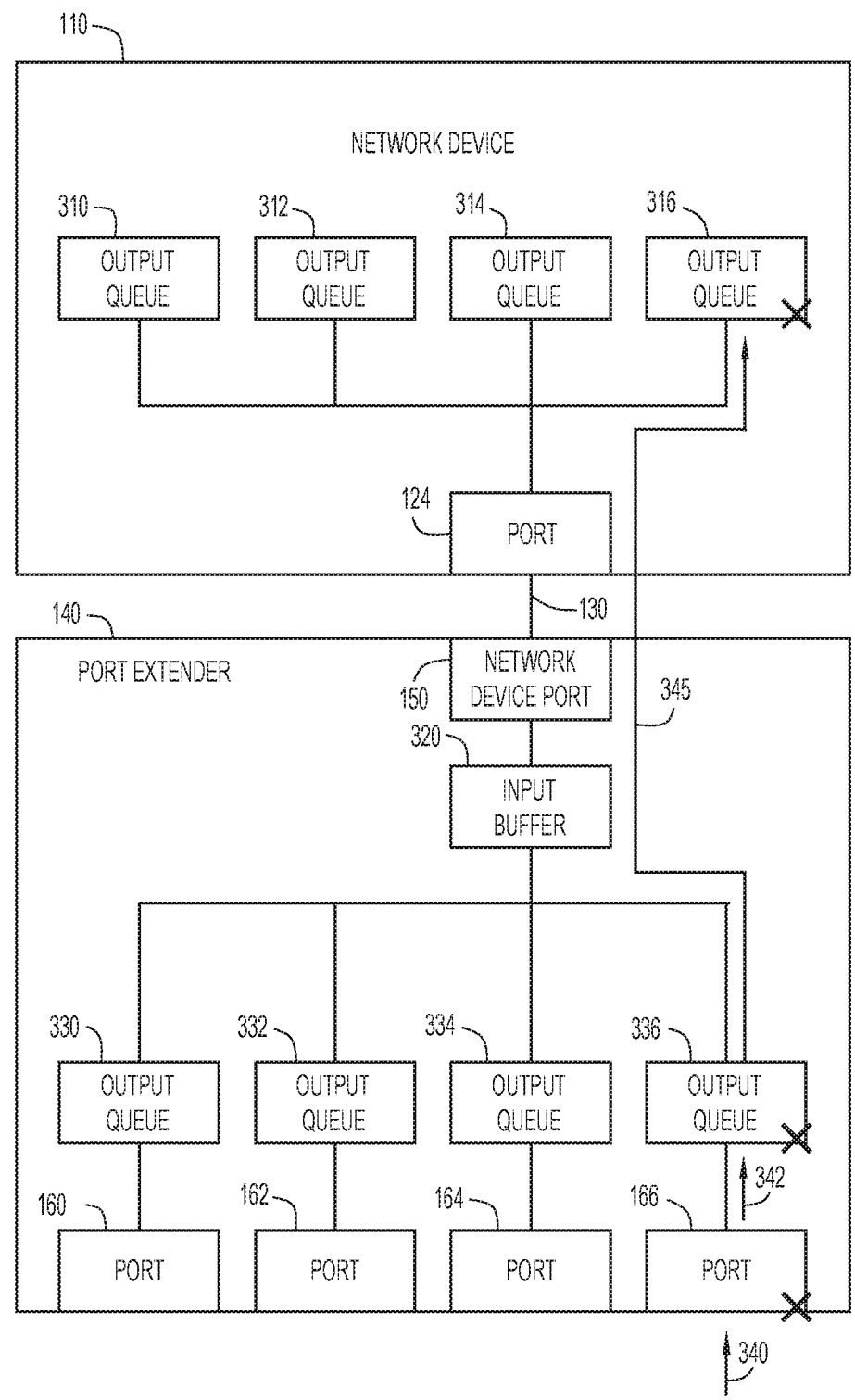
FIG. 3A is a simplified message flow diagram illustrating network flow control for congestion of a single transmit port of the port extender, according to an example embodiment.

Referring now to FIG. 3A, a simplified block diagram illustrates the network device 110 and the port extender 140 configured to pause transmission from a single front panel port 166 in response to receiving an external flow control frame. As shown in FIG. 3A, the network device 110 includes output queues 310, 312, 314, and 316 corresponding to the front panel ports 160, 162, 164, and 166 of the port extender 140. The output queues 310, 312, 314, and 316 each send data through a single port 124 of the network device via the network link 130 to the network device port 150 on the port extender. The network device 110 may be configured to add a special tag indicating from which front panel port each data frame should be transmitted.

The port extender 140 includes an input buffer 320 configured to buffer all of the traffic that is received from the network device via the network device port 150. The port extender 140 is configured to separate the data frames into output queues 330, 332, 334, and 336, which are associated with the ports 160, 162, 164, and 166, respectively. In one example, the port extender 140 reads a special tag to determine which output queue to direct each data frame. The port extender 140 also removes the special tag before directing each data frame to an output queue, since the special tag only applies to network traffic between the network device 110 and the port extender 140.

When the port extender receives a flow control message 340, such as an Ethernet pause frame, at the port 166, the port extender 140 halts transmission from the port 166 on the next frame boundary. The port 166 sends a signal 342 to the corresponding output queue 336 to stop dequeueing data into the port 166. In one example, the port 166 may include a dedicated buffer, which is not shown in FIG. 3A, and the signal 342 is sent to the output queue 336 in response to the buffer of port 166 filling up.

Once the output queue 336 fills to a predetermined threshold, the port extender 140 generates a PFC frame 345 and encodes an indication that port 166 is experiencing network congestion, and data that is scheduled for transmission from the port 166 should be paused. In one example, the PFC pause frame 345 encodes the indication of port 166 in the priority enable vector of the PFC frame 345. The network device 110 receives and parses the PFC frame 345. In response to the indication in the PFC frame 345 that the port 166 is congested, the network device 110 stops dequeueing data from the output queue 316 corresponding to the front panel port 166.

Figure 3B:
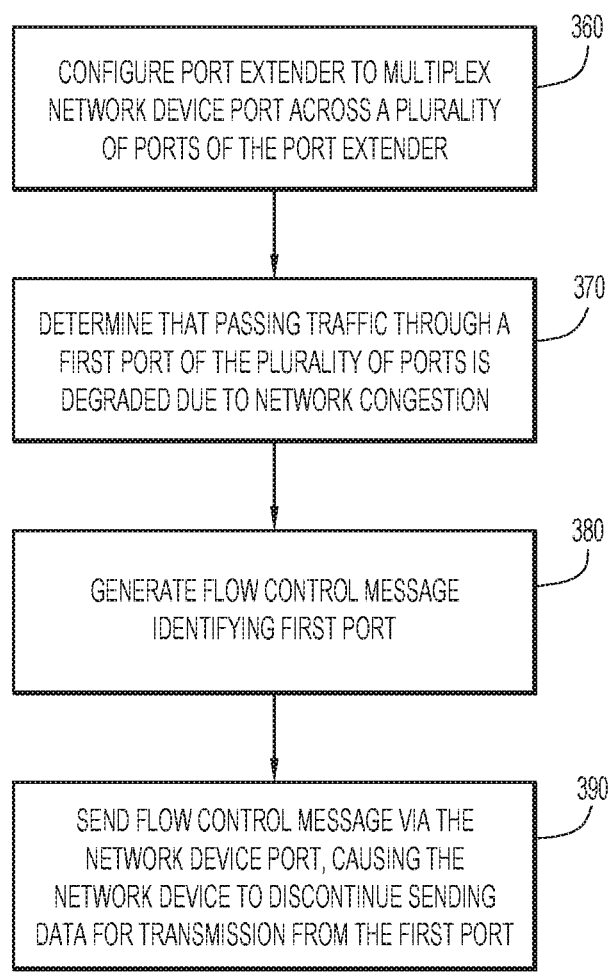
FIG. 3B is a flowchart illustrating operations of a port extender for network congestion of a single transmit port, according to an example embodiment.

Referring now to FIG. 3B, a flowchart illustrates operations performed at a port extender (e.g., port extender 140) in a process 350 for processing flow control messages for individual transmit ports. At 360, the port extender is configured to multiplex a network device port (e.g., network device port 150 as shown in FIG. 3A) across a plurality of ports on the port extender. In one example, the plurality of ports on the port extender comprise front panel ports for the network device. In another example, the port extender may be configured to multiplex the network device port across the plurality of ports based on a special tag.

At 370, the port extender determines that a first port of the plurality of ports is degraded due to network congestion. In one example, the port extender receives an external flow control message at the first port to determine that the port is degraded due to network congestion. Alternatively, the port extender may detect that an output queue associated with the first port exceeds a first predetermined threshold, i.e., the output queue is overloaded. At 380, the port extender generates a flow control message identifying the first port. In one example, the port extender generates a PFC frame and identifies the first port through the priority enable vector of the PFC frame. At 390, the port extender sends the flow control message to the network device via the network device port. The flow control message causes the network device to discontinue sending data for transmission from the first port.

Figure 4A:
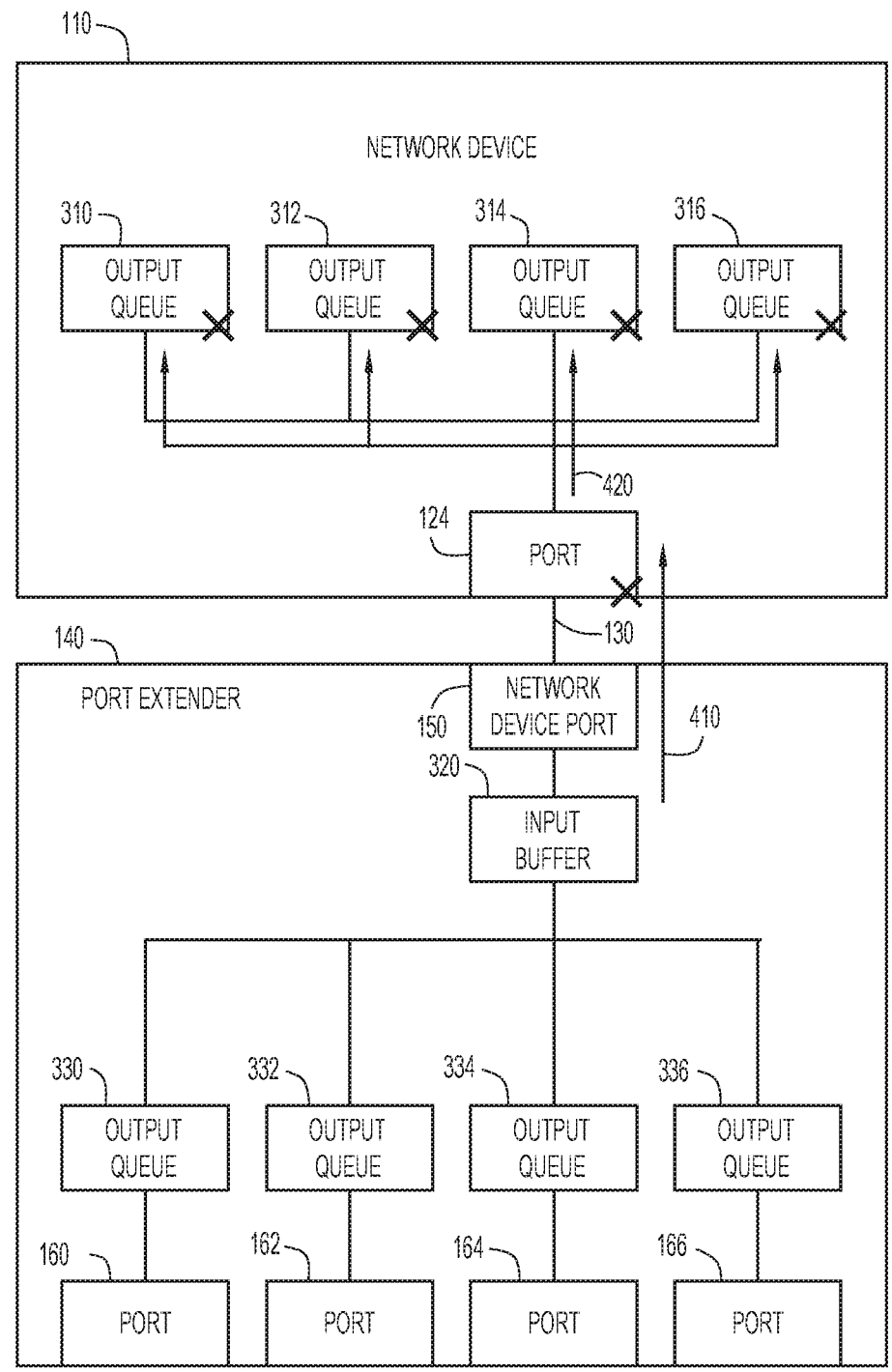
FIG. 4A is a simplified message flow diagram illustrating network flow control for congestion of a buffer affecting all of the transmit ports of the port extender, according to an example embodiment.

Referring now to FIG. 4A, a simplified block diagram illustrates the network device 110 and the port extender 140 configured to pause transmission for all front panel ports in response to filling up the input buffer 320 of the network device port 150 on the port extender 140. When the input buffer 320 becomes overloaded (e.g., based on the current amount of data in the buffer and/or the rate of the incoming data), then the port extender generates a flow control message 410 identifying that the link 130 is congested. In one example, the flow control message 410 may be a PFC frame with a predetermined priority enable vector that has been assigned to signify congestion in the link 130. The network device 110 receives the flow control message 410 and halts transmission from the port 124 at the next frame boundary.

Before any internal buffers associated with the port 124 (e.g., an input buffer not shown in FIG. 4A) becomes overloaded, the network device 110 sends a signal 420 to all of the output queues 310, 312, 314, and 316, which are scheduled to send data over the link 130 via the port 124. The signal 420 causes each of the output queues 310, 312, 314, and 316 to stop dequeueing data for transmission from the port 124. In other words, the port extender 140 sends a single flow control message (i.e., flow control message 410), which the network device 110 interprets as a flow control pause message for multiple output queues (i.e., output queues 310, 312, 314, and 316) that contribute to the network congestion on the link 130.

Figure 4B:
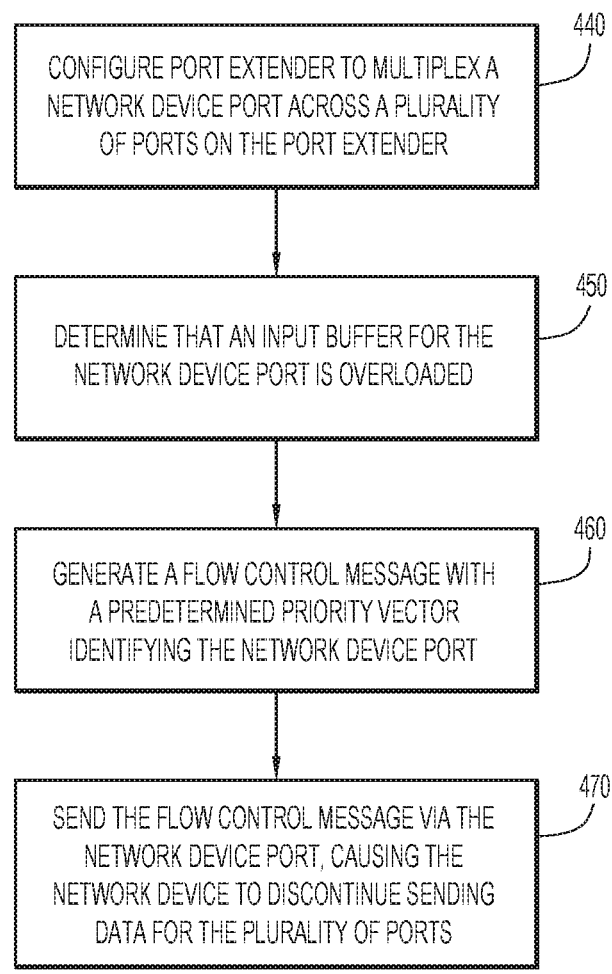
FIG. 4B is a flowchart illustrating operations of a port extender for network congestion of an input buffer from the network device, according to an example embodiment.

Referring now to FIG. 4B, a flowchart illustrates operations performed at a port extender (e.g., port extender 140) in a process 430 for processing a flow control message between the port extender and the associated network device. At 440, the port extender is configured to multiplex a network device port (e.g., network device port 150 as shown in FIG. 4A) across a plurality of ports on the port extender. In one example, the plurality of ports on the port extender comprise front panel ports for the network device. In another example, the port extender may be configured to multiplex the network device port across the plurality of ports based on a special tag.

At 450, the port extender determines that an input buffer associated with the network device port is overloaded. In one example, the determination may be based on the amount of data in the input buffer and/or the rate of information filling the input buffer. At 460, the port extender generates a flow control message identifying the network device port as congested. In one example, the network device port is identified by a predetermined value of the priority enable vector in the flow control message. In another example, the flow control message is a PFC frame with a predetermined value of the priority enable vector to identify the network device port. At 470, the port extender sends the flow control message via the network device port to the network device. The flow control message causes the network device to discontinue sending data from all of the output queues on the network device that lead into the network device port on the port extender.

Figure 5A:
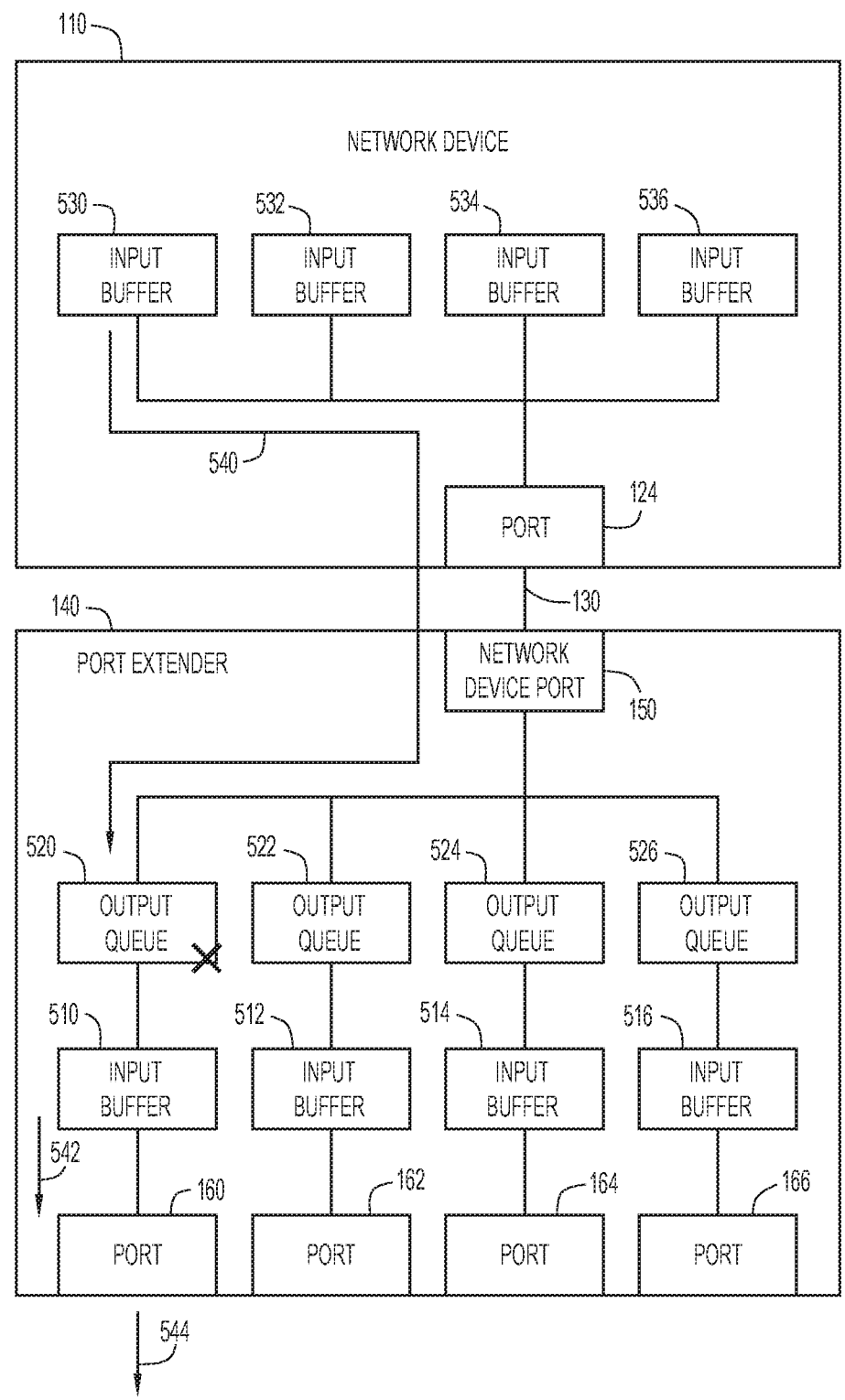
FIG. 5A is a simplified message flow diagram illustrating network flow control for congestion of a single receive port of the port extender, according to an example embodiment.

Referring now to FIG. 5A, a simplified block diagram illustrates the network device 110 and the port extender 140 configured to send an external flow control message from a single receive port that is overloaded. As shown in FIG. 5A, when the network device 110 and the port extender 140 are configured to receive data each of the front panel ports 160, 162, 164, and 166 is associated with a corresponding input buffer 510, 512, 514, and 516, respectively. The port extender 140 also includes output queues 520, 522, 524, and 526 that feed data to the network device port 150 that was received from the ports 160, 162, 164, and 166, respectively. The network device 110 includes input buffers 530, 532, 534, and 536 corresponding to the front panel ports 160, 162, 164, and 166, respectively. The port extender 140 may be configured to add a special Ethernet tag indicating from which front panel port each data frame was received.

When the input buffer 530 on the network device 110 is overloaded, the network device 110 generates a flow control message 540 to pause the data coming into the input buffer 530 via the front panel port 160. In one example, the flow control message 540 may be a PFC frame indicating the affected input buffer (e.g., input buffer 530) by a predetermined value of the priority enable vector in the PFC frame. On receiving the flow control message 540, the port extender 140 parses the flow control message to determine the front panel port that is overloaded. In response, the port extender 140 stops dequeueing data from the corresponding output queue 520. Once the output queue 520 and the input buffer 510 are full, the port extender 140 sends a signal 542 to the port 160, which sends an external flow control message 544 to halt additional data from being sent to the port 160. By identifying and pausing a single front panel port (e.g., port 160), the remaining front panel ports (e.g., ports 162, 164, and 166) continue to receive data and transfer the data to the network device 110 without interruption.

Figure 5B:
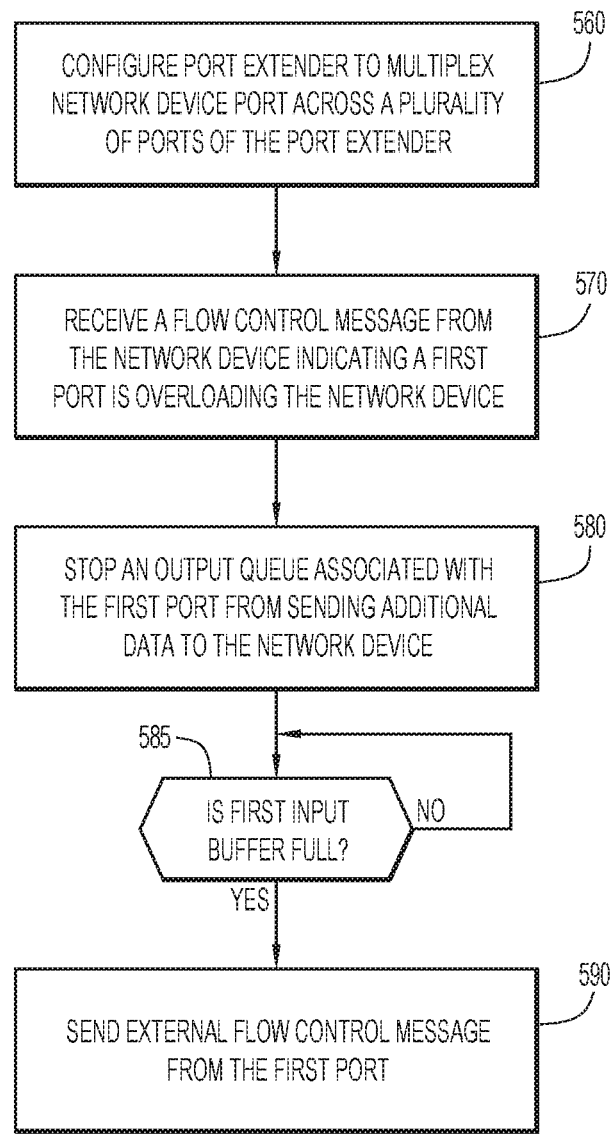
FIG. 5B is a flowchart illustrating operations of a port extender for network congestion of a single receive port, according to an example embodiment.

Referring now to FIG. 5B, a flowchart illustrates operations performed at a port extender (e.g., port extender 140) in a process 550 for processing flow control messages for individual receive ports. At 560, the port extender is configured to multiplex a network device port (e.g., network device port 150 as shown in FIG. 5A) across a plurality of ports on the port extender. In one example, the plurality of ports on the port extender comprises front panel ports for the network device. In another example, the port extender may be configured to multiplex the network device port across the plurality of ports based on a special Ethernet tag.

At 570, the port extender receives a flow control message from the network device indicating that a first port is overloading the network device. In one example, the flow control message may be a PFC frame that identifies the first port in a priority enable vector of the PFC frame. At 580, the port extender stops a first output queue associated with the first port from sending additional data to the network device. In one example, the port extender may stop the first output queue from dequeueing additional data into the network device port that is connected to the network device.

At 585, the port extender determines whether a first input buffer associated with the first port is overloaded. In one example, the port extender may determine the first input buffer is overloaded based on the amount of data in the first input buffer and/or the rate at which the first input buffer is being filled with data. If the port extender determines that the first input buffer is overloaded at 585, then the port extender generates an external flow control message and sends the external flow control message from the first port at 590.

Figure 6A:
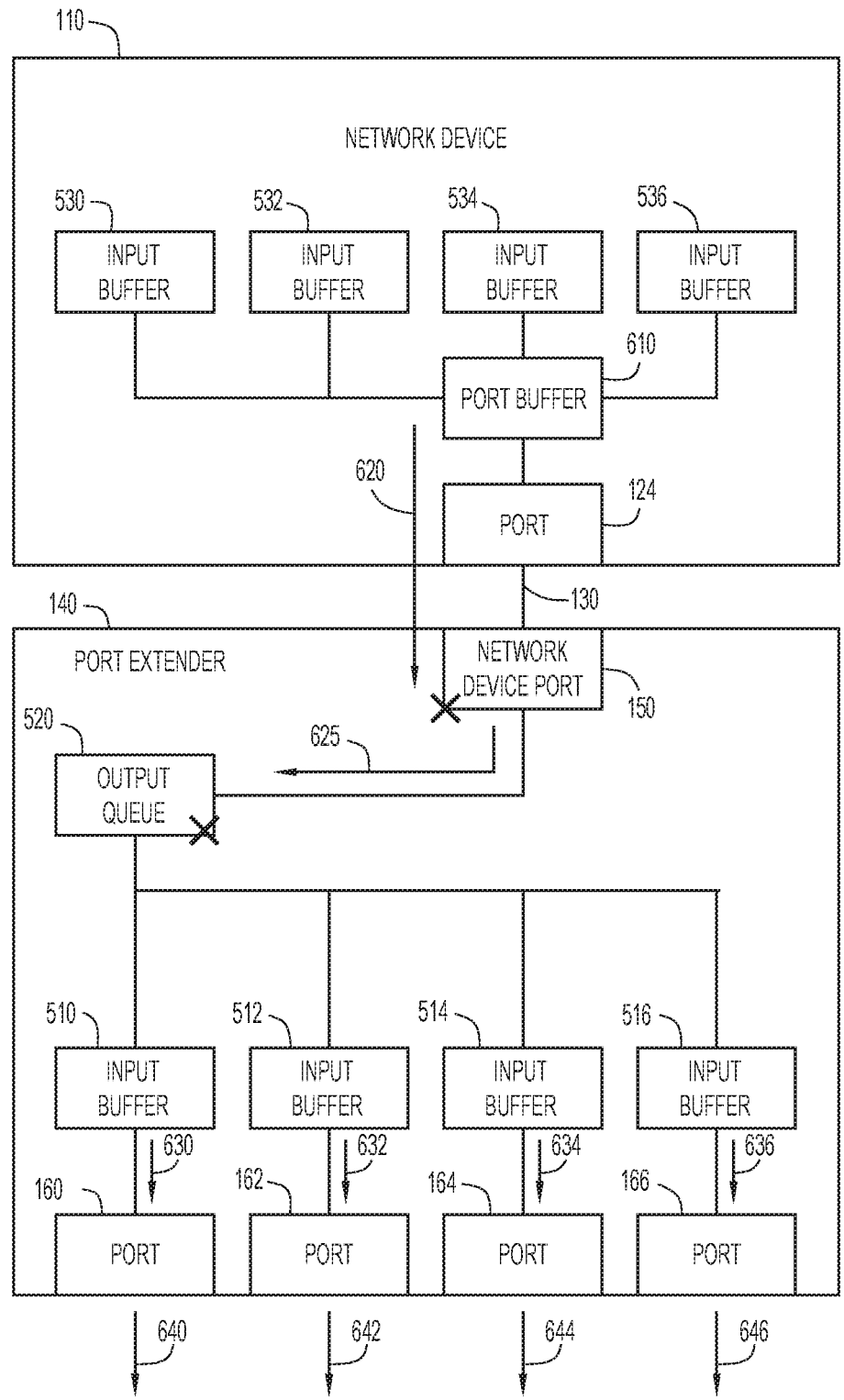
FIG. 6A is a simplified message flow diagram illustrating network flow control for congestion of all of the receive ports of the port extender, according to an example embodiment.

Referring now to FIG. 6A, a simplified block diagram illustrates the network device 110 and the port extender 140 configured to send an external flow control message from a plurality of receive front panel ports 160, 162, 164, and 166 that are directed to an overloaded port buffer 610 on the network device 110. In the embodiment depicted in FIG. 6A, in contrast to the embodiment in FIG. 5A, the port extender 140 includes a single output queue 520, which collects data traffic from all of the input buffers 510, 512, 514, and 516. Additionally, the network device 110 includes a port buffer 610 for the port 124 that is connected to the port extender 140.

When the port buffer 530 on the network device 110 is overloaded, the network device 110 generates a flow control message 620 to pause the data coming into the port buffer 610. In one example, the flow control message 620 may be a PFC frame with a predetermined value of the priority enable vector in the PFC frame that indicates that all the link 130 is overloaded, rather than only one of the front panel port as in FIG. 5A. On receiving the flow control message 620, the port extender 140 halts transmission from the network device port 150 on the next frame boundary. Additionally, the port extender 140 sends a signal 625 to stop any additional data from dequeueing out of the single output queue 520. In an alternative embodiment, such as shown in FIG. 5A, the port extender may stop data dequeueing from all of the output queues (e.g., output queues 520, 522, 524, and 526 shown in FIG. 5A) for the network device port 150.

Once the output queue 520 is full, the individual input buffers 510, 512, 514, and 516 begin to fill up. When each individual input buffer 510, 512, 514, or 516 fills up, the port extender 140 sends a signal 630, 632, 634, or 636, respectively to the corresponding front panel port 160, 162, 164, or 166. The corresponding front panel port 160, 162, 164, or 166 sends an external flow control message 640, 642, 644, or 646, respectively to halt additional data from being sent to the port 160, 162, 164, or 166. As the input buffers 510, 512, 514, and 516 individually fill at different times, the corresponding external flow control messages 640, 642, 644, and 646 may be sent at different times. If any input buffer 510, 512, 514, or 516 do not fill up, then the corresponding external flow control message 640, 642, 644, or 646 is not sent.

Figure 6B:
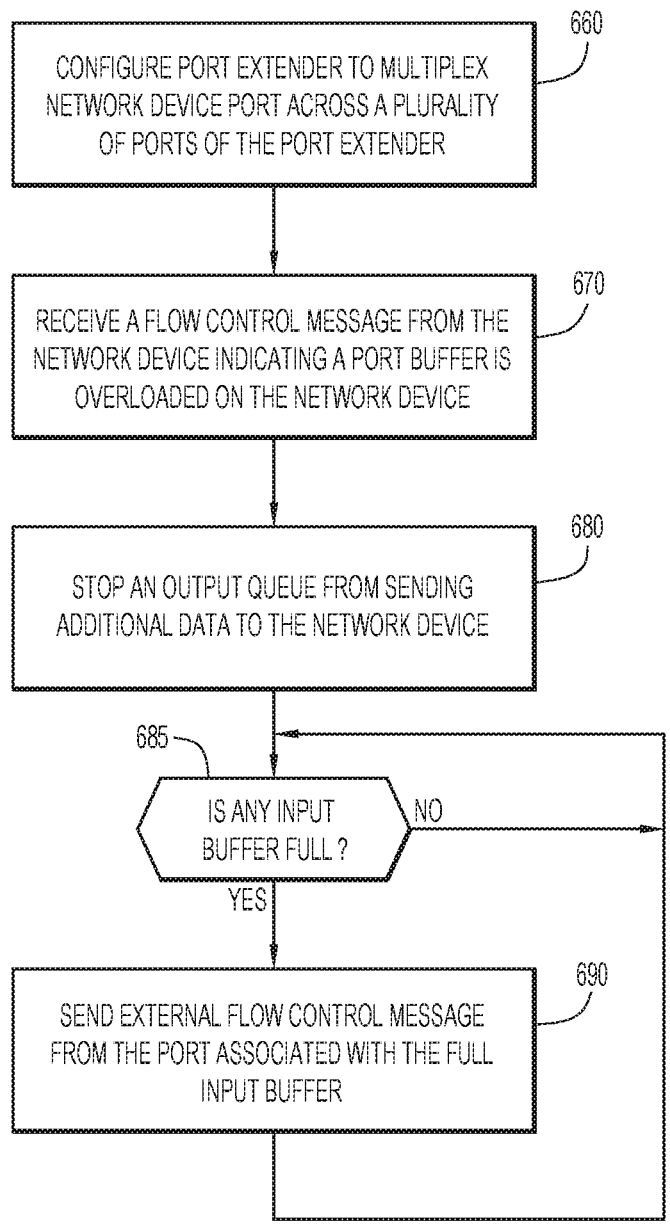
FIG. 6B is a flowchart illustrating operations of a port extender for network congestion of all of the receive ports of the port extender, according to an example embodiment.

Referring now to FIG. 6B, a flowchart illustrates operations performed at a port extender (e.g., port extender 140) in a process 650 for processing flow control messages for the link between a network device (e.g., network device 110) and the port extender. At 660, the port extender is configured to multiplex a network device port (e.g., network device port 150 as shown in FIG. 6A) across a plurality of ports on the port extender. In one example, the plurality of ports on the port extender comprise front panel ports for the network device. In another example, the port extender may be configured to multiplex the network device port across the plurality of ports based on a special Ethernet tag.

At 670, the port extender receives a flow control messages from the network device indicating that a port buffer for the network device is overloaded. In one example, the flow control message may be a PFC frame with a predetermined value of a priority enable vector of the PFC frame indicating the entire link between the network device and the port extender is to be paused. At 680, the port extender stops at least one output queue from sending additional data from the network device port to the network device. In one example, all of the front panel ports may use a single output queue for the network device port. Alternatively, each front panel port may be associated with an individual output queue for the network device port.

At 685, the port extender determines whether any input buffer associated with the front panel ports is full. In one example, the port extender may determine that an input buffer is full based on the amount of data in the input buffer and/or the rate at which the input buffer is being filled with data. If the port extender determines that an input buffer is full at 685, then the port extender generates an external flow control message and sends the external flow control message from the corresponding front panel port at 690. The port extender then returns to monitor the remaining input buffers at 685 to determine whether to send additional external flow control messages.

Figure 7:
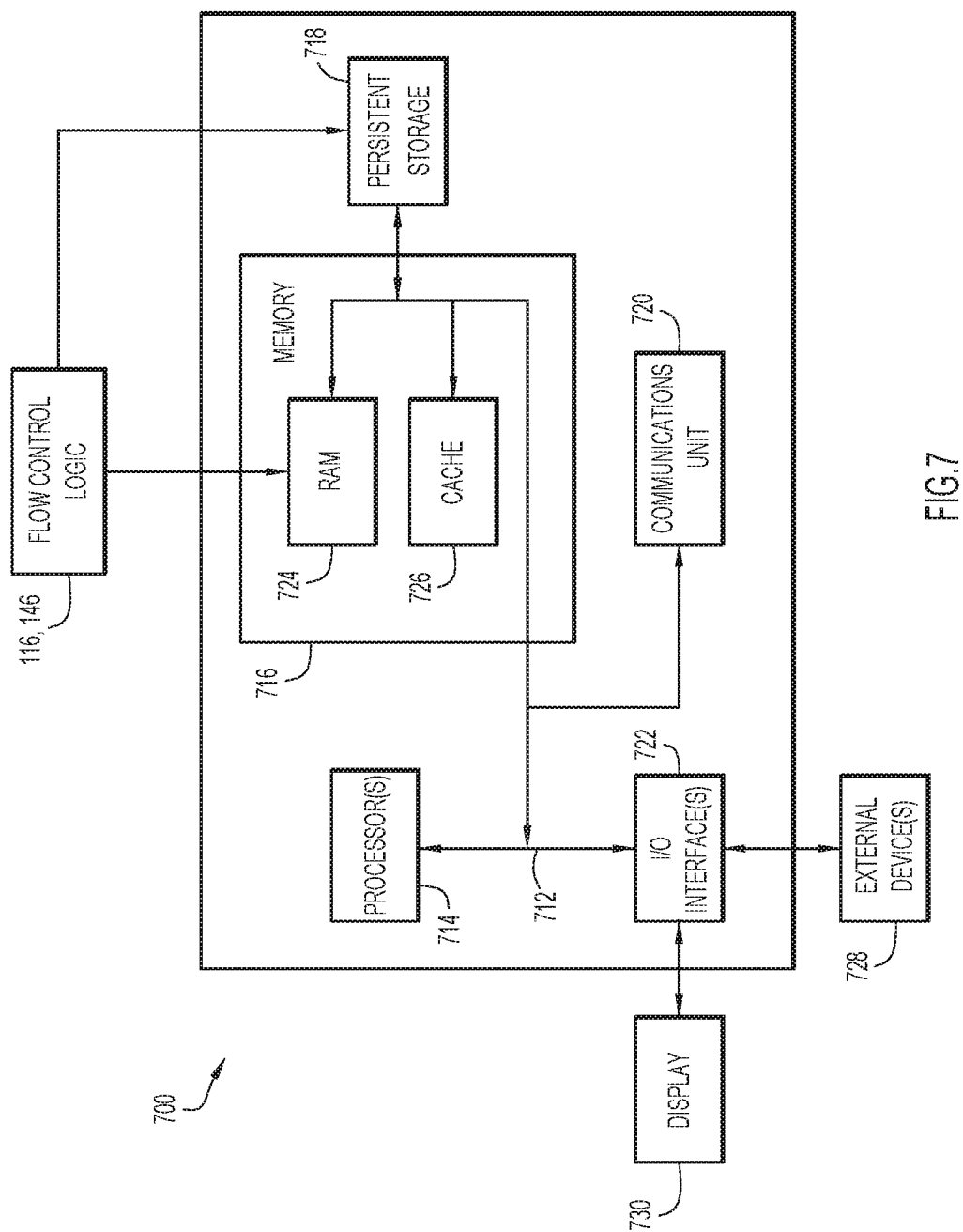
FIG. 7 illustrates a simplified block diagram of a device that may be configured to perform methods presented herein, according to an example embodiment.

Referring now to FIG. 7, a hardware block diagram illustrates a computing device 700 that may perform the functions of any of the servers or computing or control entities (e.g., network device 110 or port extender 140) referred to herein in connection with the port extender flow control system described herein. It should be appreciated that FIG. 7 provides only an illustration of one embodiment and does not imply any limitations with regard to the environments in which different embodiments may be implemented. Many modifications to the depicted environment may be made.

As depicted, the device 700 includes a bus 712, which provides communications between computer processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes random access memory (RAM) 724 and cache memory 726. In general, memory 716 can include any suitable volatile or non-volatile computer readable storage media. Instructions for the flow control logic 116 or 146 may be stored in memory 716 or persistent storage 718 for execution by processor(s) 714.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface units, such as network interface cards. Communications unit 720 may provide communications through the use of either or both physical and wireless communications links.

I/O interface(s) 722 allows for input and output of data with other devices that may be connected to computer device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, network devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the test module, the network device, the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to user identities or credentials). The database system may be included within or coupled to the server and/or client systems. The database systems and/or storage structures may be remote from or local to the computer or other processing systems, and may store any desired data (e.g., data relating to user authentication/authorization or credentials).

The present embodiments may employ any number of any type of user interface (e.g., Graphical User Interface (GUI), command-line, prompt, etc.) for obtaining or providing information (e.g., data relating to user authentication/authorization or credentials), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In summary, the techniques presented herein provide for a standard protocol with a modified semantic to signal link-level flow control of front panel ports connected to a port extender of a main switch/router. With the techniques described herein, all ports are standard and symmetric and do not require proprietary signaling. Eliminating the design and verification of yet another proprietary protocol enables maximum flexibility in system design and enables connectivity of cross-platform network devices and port extenders, as long as both support the PFC standard.

In one form, a method is provided to enable a port extender to provide individual flow control for ports multiplexed from a network device. The method includes configuring a port extender to multiplex a network device port across a plurality of ports on the port extender. The method also includes determining that passing traffic through a first port of the plurality of ports is degraded due to network congestion, and generating a flow control message identifying the first port. The method further includes sending the flow control message via the network device port to the network device. The flow control message causes a network device coupled to the network device port to discontinue sending data for transmission from the first port.

In another form, an apparatus comprising a network device port, a plurality of ports, and a processor is provided. The network device port is configured to communicate with a network device. The plurality of ports are configured to transmit and receive data from one or more networks. The processor is configured to multiplex the network device port across the plurality of ports. The processor is also configured to determine that passing traffic through a first port of the plurality of ports is degraded due to congestion in the one or more networks, and generate a flow control message identifying the first port. The processor is further configured to send the flow control message via the device control port. The flow control message causes the network device to discontinue sending data for transmission from the first port.

In still another form, a system comprising a network device and a port extender is provided. The network device is configured to process messages between computing device on one or more computer networks. The port extender is coupled to the network device, and is configured to multiplex device port across a plurality of ports on the port extender. The port extender is also configured to determine that passing traffic through a first port of the plurality of ports is degraded due to network congestion, and generate a flow control message identifying the first port. The port extender is further configured to send the flow control message to the network device via the network device port. The flow control message causes the network device to discontinue sending data for transmission from the first port.

In yet another form, a non-transitory computer readable storage media is provided that is encoded with instructions that, when executed by a processor of a port extender, cause the processor to configure the port extender to multiplex a network device port across a plurality of ports on the port extender. The instructions also cause the processor to determine that passing traffic through a first port of the plurality of ports is degraded due to network congestion, and generate a flow control message identifying the first port. The instructions further cause the processor to send the flow control message via the network device port to the network device. The flow control message causes a network device coupled to the network device port to discontinue sending data for transmission from the first port.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    configuring a port extender to multiplex a network device port across a plurality of ports on the port extender;
    determining that passing traffic through a first port of the plurality of ports is degraded due to network congestion;
    generating a Priority-based Flow Control (PFC) frame identifying the first port as a first priority value in a priority vector of the PFC frame; and
    sending the PFC frame via the network device port, wherein the PFC frame causes a network device coupled to the network device port to discontinue sending data for transmission from the first port.

2. The method of claim 1, wherein each of the plurality of ports is assigned to a respective priority in the priority vector.

3. The method of claim 1, wherein a predetermined value of the priority vector of the PFC frame identifies all of the plurality of ports.

4. The method of claim 1, wherein determining that the first port of the plurality of ports is degraded due to network congestion comprises receiving an external flow control message at the first port.

5. The method of claim 1, wherein determining that the first port of the plurality of ports is degraded due to network congestion comprises detecting that an output queue associated with the first port exceeds a first predetermined threshold.

6. The method of claim 5, wherein the output queue is associated with every port in the plurality of ports.

7. The method of claim 1, wherein generating the PFC frame comprises generating the PFC frame with a first time value corresponding to the first port.

8. An apparatus comprising:
    a network device port configured to communicate with a network device;
    a plurality of ports configured to transmit and receive data from one or more networks; and
    a processor configured to:
        multiplex the network device port across the plurality of ports;
        determine that passing traffic through a first port of the plurality of ports is degraded due to congestion in the one or more networks;
        generate a Priority-based Flow Control (PFC) frame identifying the first port as a first priority value in a priority vector of the PFC frame; and
        send the PFC frame via the network device port, wherein the PFC frame causes the network device to discontinue sending data for transmission from the first port.

9. The apparatus of claim 8, wherein the processor is configured to assign each of the plurality of ports to a respective priority in the priority vector.

10. The apparatus of claim 8, wherein the processor is configured to assign a predetermined value of the priority vector of the PFC frame to identify all of the plurality of ports.

11. The apparatus of claim 8, wherein the processor is configured to determine that the first port of the plurality of ports is degraded due to network congestion by receiving an external flow control message via the first port.

12. The apparatus of claim 8, further comprising an output queue associated with the first port, wherein the processor is configured to determine that the first port of the plurality of ports is degraded due to network congestion by detecting that the output queue associated with the first port exceeds a first predetermined threshold.

13. The apparatus of claim 12, wherein the output queue is associated with every port in the plurality of ports.

14. The apparatus of claim 8, wherein the processor is configured to generate the PFC frame by generating the PFC frame with a first time value corresponding to the first port.

15. A system comprising:
- a network device configured to process messages between computing devices on one or more computer networks; and
- a port extender coupled to the network device, the port extender configured to:
  - multiplex a network device port across a plurality of ports on the port extender;
  - determine that passing traffic through a first port of the plurality of ports is degraded due to network congestion;
  - generate a Priority-based Flow Control (PFC) frame identifying the first port as a first priority value in a priority vector of the PFC frame; and
  - send the PFC frame to the network device via the network device port, wherein the PFC frame causes the network device to discontinue sending data for transmission from the first port.

16. The system of claim 15, wherein each of the plurality of ports is assigned to a respective priority in the priority vector.

17. The system of claim 15, wherein the port extender is configured to determine that the first port of the plurality of ports is degraded due to network congestion by receiving an external flow control message at the first port.

18. The system of claim 15, wherein the port extender is configured to determine that the first port of the plurality of ports is degraded due to network congestion by detecting that an output queue associated with the first port exceeds a first predetermined threshold.

19. The system of claim 18, wherein the output queue is associated with every port in the plurality of ports.

20. The system of claim 15, wherein the port extender is configured to generate the PFC frame by generating the PFC frame with a first time value corresponding to the first port.

* * * * *